(12) United States Patent
Grosser-Samuels

(10) Patent No.: US 6,202,443 B1
(45) Date of Patent: Mar. 20, 2001

(54) ADJUSTABLE JEWELRY

(76) Inventor: Jacquelin Annette Grosser-Samuels, 18024 Rock Branch, Dallas, TX (US) 75287

( * ) Notice: Subject to any disclaimer, the term of this patent is extended or adjusted under 35 U.S.C. 154(b) by 0 days.

(21) Appl. No.: 09/256,556

(22) Filed: Feb. 24, 1999

(51) Int. Cl.[7] ................................................ A44C 5/00
(52) U.S. Cl. ................ 63/3; 63/3.2; 63/23; 24/115 G
(58) Field of Search .................... 63/3, 3.1, 3.2, 63/21, 23; 24/115 G

(56) References Cited

U.S. PATENT DOCUMENTS

| | | | |
|---|---|---|---|
| 534,946 | * | 2/1895 | Bates ................... 63/3.2 X |
| 662,171 | * | 11/1900 | Lederer .................... 63/21 |
| 1,419,370 | * | 6/1922 | Genaille .................... 63/21 |
| 1,632,716 | | 6/1927 | Schweigert . |
| 1,637,003 | | 7/1927 | Lang . |
| 2,521,589 | * | 9/1950 | Livingston ............ 63/3.2 X |
| 2,529,058 | * | 11/1950 | Tell et al. ............. 63/3.2 X |
| 2,586,758 | * | 2/1952 | Zerr ..................... 63/3.2 X |
| 3,074,135 | | 1/1963 | Brodowski . |
| 3,075,266 | | 1/1963 | Gaupp . |
| 3,080,867 | | 3/1963 | Eichinger . |
| 3,187,396 | | 6/1965 | Carroll . |
| 3,271,977 | | 9/1966 | Bohlinger et al. . |
| 3,481,155 | | 12/1969 | Cook . |
| 3,974,545 | | 8/1976 | Lossini . |
| 4,334,413 | | 6/1982 | Gaston et al. . |
| 4,506,417 | | 3/1985 | Hara . |
| 4,551,993 | * | 11/1985 | Nagahori .................. 63/31 |
| 4,611,368 | | 9/1986 | Battersby . |
| 4,675,948 | | 6/1987 | Bengtsson . |
| 4,894,757 | * | 1/1990 | Frusha et al. ............... 63/3 |
| 5,263,232 | * | 11/1993 | Matoba ................ 24/115 G |
| 5,279,132 | * | 1/1994 | Swaim ................... 63/3.1 |
| 5,365,641 | | 11/1994 | Watanabe et al. . |
| 5,459,903 | | 10/1995 | Treacy . |
| 5,611,118 | | 3/1997 | Bibbee . |
| 5,678,282 | | 10/1997 | Stewart . |
| 5,711,032 | | 1/1998 | Carpenter . |
| 5,722,260 | | 3/1998 | Mangano . |
| 5,737,808 | * | 4/1998 | Ikeda . |
| 5,774,957 | | 7/1998 | Kohl et al. . |
| 5,819,380 | | 10/1998 | Paolercio et al. . |
| 5,826,309 | | 10/1998 | Tsamas . |

FOREIGN PATENT DOCUMENTS

| | | | |
|---|---|---|---|
| 701902 | * | 3/1931 | (FR) ........................... 63/3 |
| 1276059 | * | 10/1961 | (FR) ...................... 24/115 G |

* cited by examiner

Primary Examiner—Terry Lee Melius
Assistant Examiner—Andrea Chop
(74) Attorney, Agent, or Firm—Alvin R. Wirthlin; Akin, Gump, Strauss, Hauer & Feld, L.L.P.

(57) ABSTRACT

Methods and apparatus for precisely adjusting an article of jewelry to quickly and conveniently accommodate the particular fashions desires, size and clothing of the wearer. According to the invention, a flexible member, such as a necklace chain, is looped upon itself to form a loop portion, a first leg and a second leg. A slidable clamping device is mounted on the first and second legs of the flexible member. The slidable clamping device is adapted, in response to the application of an external compressive force, to slide freely along the lengths of the first and second legs of the flexible member, thereby precisely adjusting the size of the loop portion. When the external compressive force is released, the slidable clamping device securely prevents relative movement between the slidable clamping device, the first leg and the second leg of the flexible member.

5 Claims, 4 Drawing Sheets

ADJUSTABLE JEWELRY

FIELD OF THE INVENTION

The present invention r elates to jewel ry, and more particularly to methods and apparatus for precisely adjusting the length of jewelry, such as necklaces, to easily accommodate the fashion desires, size, and clothing of the wearer.

BACKGROUND

For many years, people have worn necklaces at various different lengths depending upon the prevailing fashion at the time. During some years the common length has been a short choker length of approximately fifteen inches. During other years the common length has been eighteen inches or longer. The trends in length have come and gone repeatedly over the decades.

Necklaces commonly comprise a fixed length of flexible chain made from one or more precious metals, such as gold, silver and platinum, and these chains are available in a wide variety of designs. The flexible chains are also commonly adorned with a wide variety of pendants, which generally comprise one or more precious stones, such as diamonds, rubies and sapphires, mounted in settings of precious metal. Purchasers of fine jewelry currently select a pendant of a desirable style and size and have it mounted on a flexible chain having a fixed length, which is usually fifteen, eighteen, twenty-four, or thirty inches. If the popular fashion changes, for example, the pendant can in many cases later be mounted on a chain of a different length, but this generally requires the purchase of a new chain and also often requires the services of a professional jeweler to remove the pendant from the old chain and mount it on the new chain. Thus, mounting a pendant on a new chain can be inconvenient, time consuming and expensive.

In fine jewelry the most common commercially-available necklace length during the last twenty years has been approximately eighteen inches, which generally allows the looped end to hang about two to three inches below an average-sized person's collar bone. A twenty-four-inch necklace has also been fashionable from time to time, which length generally allows the looped end to hang about three inches lower than the eighteen-inch chain. A thirty-inch necklace has been another common length, but this has generally been the longest commercially-available necklace length.

People, of course, come in a wide variety of body shapes and sizes, and a necklace chain of a given length will therefore hang quite differently on different people. An eighteen-inch necklace chain, for example, which hangs at a fashionable length on an average-sized person, would not hang at the same fashionable length on a relatively larger or relatively smaller person. Particularly large people and particularly small people, including children, have therefore, in some cases, been unable to wear necklaces and other jewelry at appropriate fashionable lengths.

Moreover, the style and type of a person's clothing can interfere with the appearance of a necklace and affect the way the necklace hangs. For example, a pendant which hangs at approximately the same length as the neckline of the person's clothing can often be hidden from view by the clothing. A necklace chain that hangs at a fashionable length when worn over light clothing may not hang at the same fashionable length when worn over relatively bulky clothing.

It is therefore desirable to provide methods and apparatus which allow the length of jewelry, such as necklaces, to be precisely adjusted to quickly and conveniently accommodate the particular fashion desires, size and clothing of the wearer. Such methods and apparatus would permit the wearer to precisely adjust the length of the necklace chain so that the pendant or other ornament hangs at the most fashionable, appropriate and flattering position, regardless of the person's particular size and clothing. It is also desirable to provide methods and apparatus which allow the person to adapt a necklace to accommodate a variety of different fashionable lengths without requiring the person to purchase a new chain of a different length and have the pendent mounted on the new chain.

SUMMARY OF THE INVENTION

The present invention provides methods and apparatus for precisely adjusting the length of jewelry, such as necklaces, to easily and conveniently accommodate the particular fashion desires, size and clothing of the wearer. Since the present invention allows the necklace to be precisely adjusted to any desired length, the necklace can be custom fit to match the prevailing fashion at the time, regardless of the particular size and clothing of the wearer. Those skilled in the art will understand that the present invention is not limited to necklaces, but can also be readily applied to jewelry commonly worn elsewhere, such as around the waist, wrist and ankle.

The apparatus according to the present invention comprises a flexible member, such as a chain, which is looped upon itself to form a loop portion, a first leg terminating in a first free end and a second leg terminating in a second free end. Alternatively, the flexible member can be formed of a single, continuous length of material, which itself forms a loop and thus has no free ends. The flexible member can be a chain formed of a precious metal, such as gold, silver and platinum, or can be a length of some other flexible material, such as fabric, string, plastic or silicone.

A slidable clamping device is mounted on the flexible member so that the first leg and the second leg of the flexible member project through the slidable clamping device. The slidable clamping device, when positioned on the flexible member, securely prevents relative movement between the clamping device, the first leg and the second leg of the flexible member. The slidable clamping device, however, can be adapted to slide freely along the lengths of the first leg and the second leg of the flexible member, thereby increasing and decreasing the size of the loop portion of the flexible member. The slidable clamping device can be easily moved to any desired position along the lengths of the first and second legs of the flexible member, and, thus, the size of the loop portion of the flexible member can be precisely adjusted. Once positioned so that the desired size of the loop portion has been obtained, the slidable clamping device can be adapted to once again securely prevent relative movement between the slidable clamping device, the first leg and the second leg of the flexible member. When the necklace is worn, the slidable clamping device is generally positioned at the back of the person's neck with the loop portion of the flexible member extending around the person's neck and hanging down the chest, depending upon the size of the loop portion.

The invention also preferably comprises one or more ornaments, such as pendants, mounted on the flexible member, but this is not a necessary aspect of the invention. First and second end stops also can be attached to the first and second free ends, respectively, of the flexible member. The first and second end stops are preferably sized so that they are too large to pass through the slidable clamping device. Thus, the first and second end stops can provide added security to prevent the slidable clamping device from inadvertently sliding completely off either the first leg, the second leg or both. If one or more ornaments are mounted on the flexible member, the first and second end stops will also provide added security to prevent an ornament from inadvertently sliding completely off either the first leg or the second leg of the flexible member and becoming lost.

The method according to the present invention is a method for precisely adjusting the length of jewelry, such as a necklace, to easily and conveniently accommodate the particular fashion desires, size and clothing of the wearer. The method comprises the steps of providing a flexible member; looping the flexible member upon itself to form a loop portion, a first leg and a second leg; positioning a slidable clamping device on the flexible member so that the first leg and the second leg of the flexible member project through the slidable clamping device, adapting the slidable clamping device so that it slides freely along the lengths of the first leg and the second leg of the flexible member and thereby increases and decreases the size of the loop portion of the flexible member so that it hangs at the desired length. The method can also comprise the step of mounting a pendent of a desired style and design on the loop portion of the flexible member, but this is not a necessary aspect of the invention. The method can further comprise the step of positioning the slidable clamping device so that it hangs at the back of the neck of the wearer.

Those skilled in the art will further appreciate the features and advantages of the present invention, together with other aspects thereof, upon reading the detailed description of preferred embodiments, which follows, in conjunction with the drawings.

DETAILED DESCRIPTION OF PREFERRED EMBODIMENTS

Figure 1A:
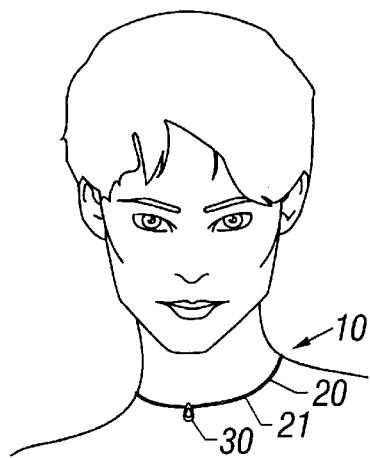
FIGS. 1A and 1B are front and rear views, respectively, showing an article of adjustable jewelry according to the present invention in place around the neck of a wearer, in which the article of adjustable jewelry is depicted as adjusted to a short length.
Figure 1B:
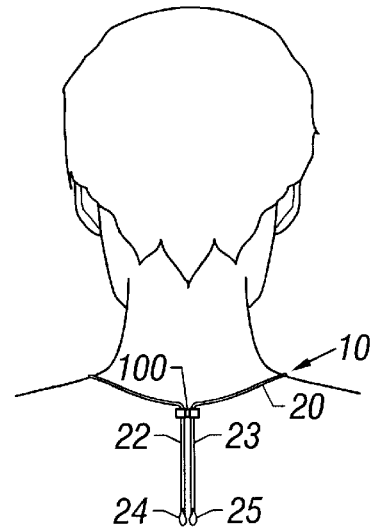
Figure 1C:
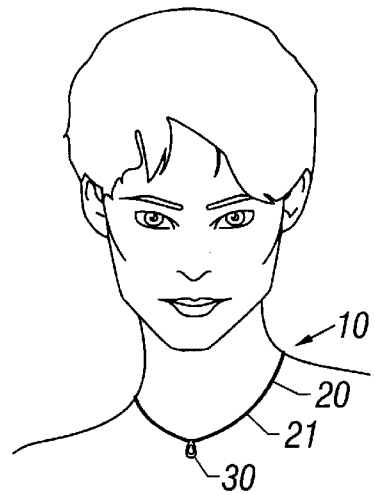
FIGS. 1C and 1D are front and rear views similar to FIGS. 1A and 1B, respectively, in which the article of jewelry is depicted as adjusted to a medium length.
Figure 1D:
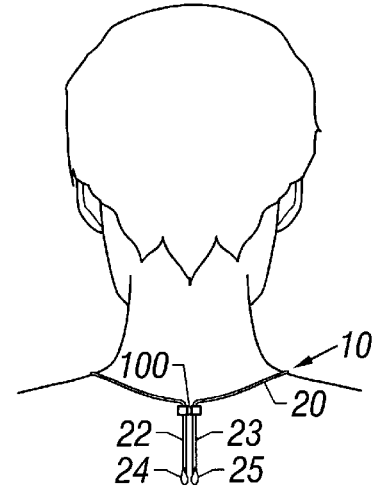
Figure 1E:
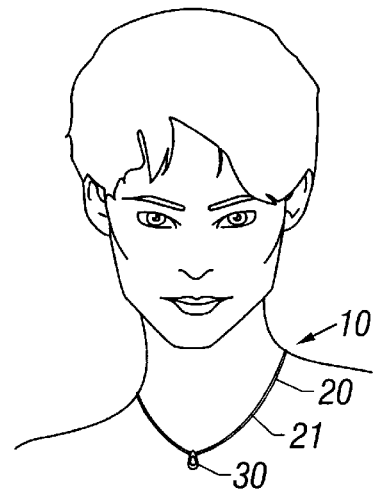
FIGS. 1E and 1F are front and rear views similar to FIGS. 1A and 1B, respectively, in which the article of jewelry is depicted as adjusted to a long length.
Figure 1F:
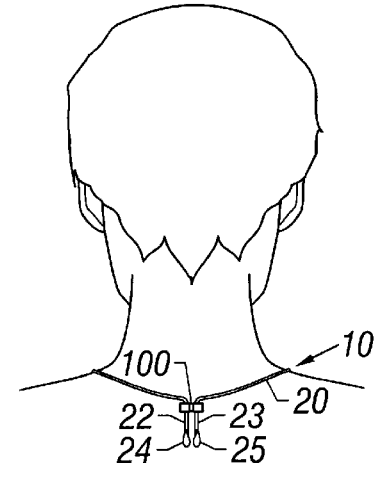

FIGS. 1A through 1F show a combination of front and rear views of an article of adjustable jewelry 10 according to the present invention. The article of adjustable jewelry 10 comprises a flexible member 20 and a slidable clamping device 100. Flexible member 20 can be formed of any suitable flexible material, such as metal, fabric, string, plastic or silicone. Flexible member 20 is preferably formed of a precious metal, such as gold, silver and platinum, using methods that are well known in the art. Loop portion 21 of flexible member 20 can extend around the neck of the wearer. First leg 22 and second leg 23 of flexible member 20 can extend down the back of the wearer's neck. First leg 21 terminates in a first free end to which first end stop 24 is attached by methods well known in the art, such as soldering. Second leg 23 terminates in a second free end to which second end stop 25 is attached by similar methods. First and second end stops 24 and 25 can be fashioned in a wide variety of decorative and ornamental shapes and can also comprise precious stones, such as diamonds, rubies and sapphires. Alternatively, flexible member 20 can be a single continuous length of material which itself forms a loop and which therefore would not have a first free end or a second free end. Thus, in this alternative embodiment, first end stop 24 and second end stop 25 also would not be present.

Ornament 30, which can be a pendant comprising one or more precious stones, such as diamonds, rubies, sapphires and others, can be mounted on loop portion 21 of flexible member 20. Ornament 30 is preferably mounted on flexible member 20 according to methods well known in the art so that ornament 30 can freely slide along the length of loop portion 21 of flexible member 20.

As depicted in FIGS. 1A through 1F, slidable clamping device 100 can be adapted to slide freely along the length of first leg 22 and second leg 23 so that loop portion 21 of flexible member 20 can be precisely adjusted to any desired size. When slidable clamping device 100 is adjusted so that loop portion 21 is relatively small, ornament 30, if utilized, hangs relatively higher on the front of wearer's neck, and first and second legs 22 and 23 extend relatively farther down the wearer's back. When slidable clamping device 100 is adjusted so that loop portion 21 is relatively large, ornament 30, if utilized, hangs relatively lower on the wearer's neck or chest, and first and second legs 22 and 23 do not extend as far down the wearer's back. It will be appreciated that, since slidable clamping device 100 can be positioned at any desired location along first and second legs 22 and 23, loop portion 21 of flexible member 20 can be adjusted to any desired size and thereby accommodate any desired fashionable length, regardless of the wearer's relative size and clothing.

Figure 2A:
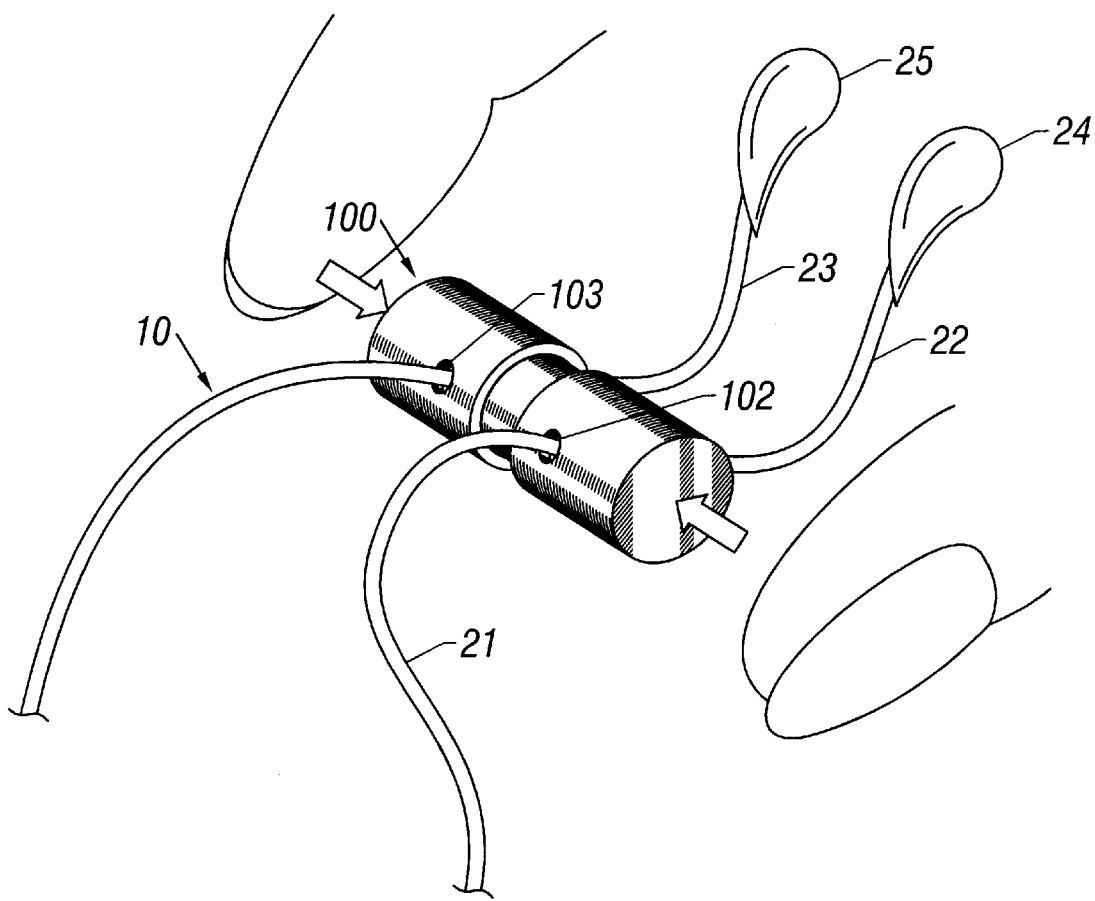
FIG. 2A is a perspective view of an article of adjustable jewelry according to the present invention.
Figure 3:
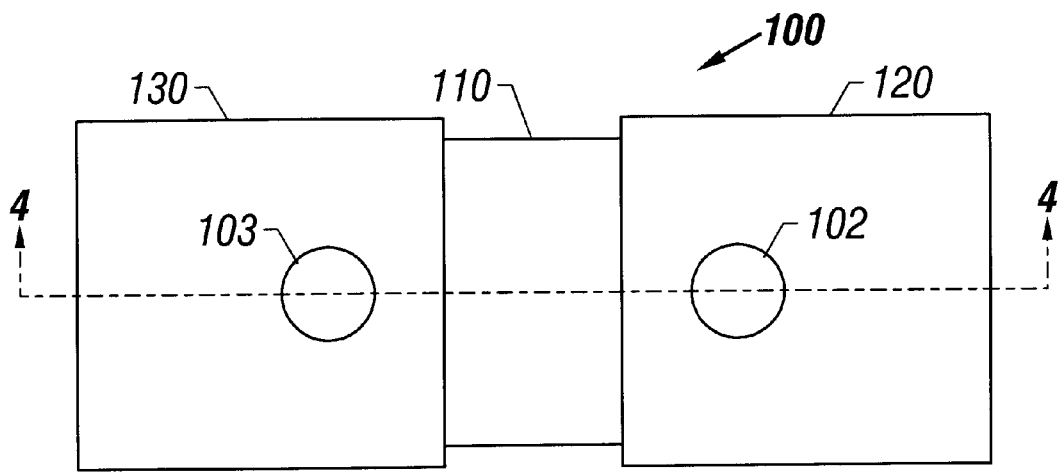
FIG. 3 is a detailed view of a preferred embodiment of a slidable clamping device according to the present invention.

FIG. 2A is a perspective view of the article of adjustable jewelry 10 according to the invention. First and second legs 22 and 23 of flexible member 20 extend through first passage 102 and second passage 103, respectively, of slidable clamping device 100. FIG. 3 is a more detailed view of slidable clamping device 100.

Figure 2B:
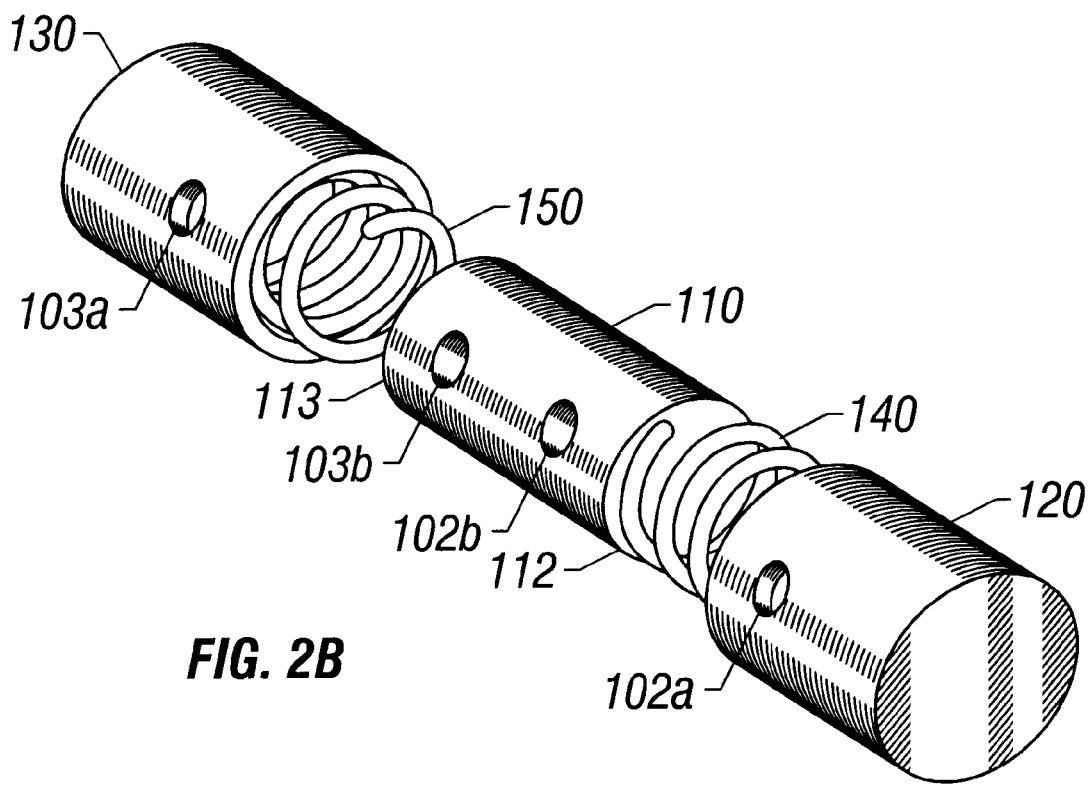
FIG. 2B is an exploded perspective view of a slidable clamping device according to the present invention.
Figure 2C:
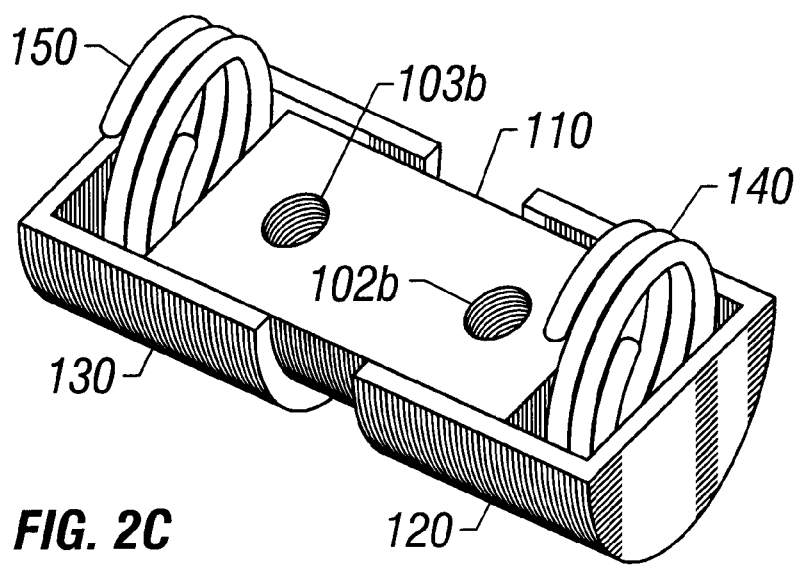
FIG. 2C is a sectional perspective view of the assembled slidable clamping device of FIG. 2A.
Figure 4:
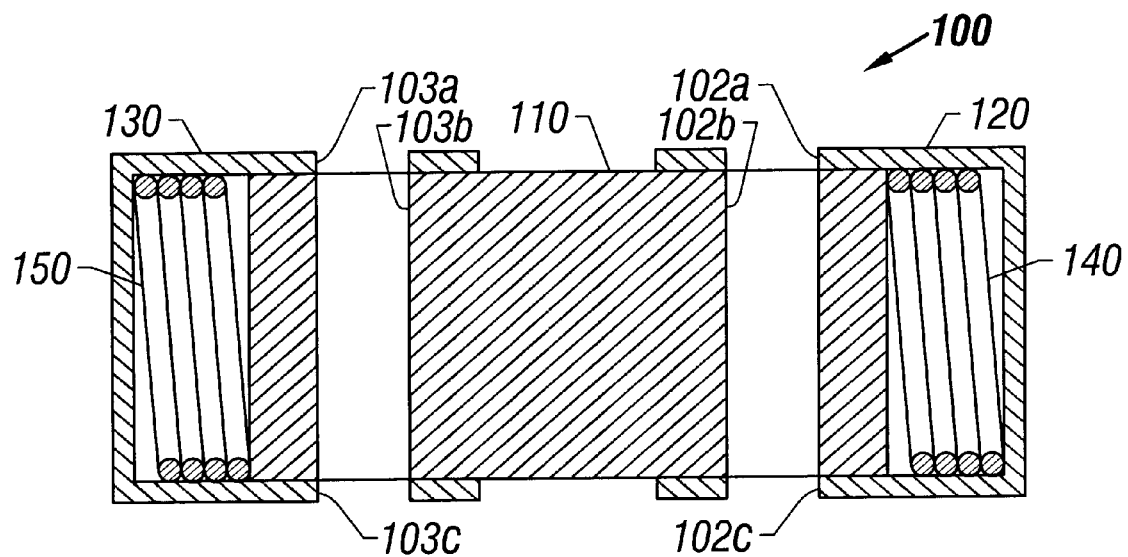
FIG. 4 is a cross-sectional view through the lines 4—4 of FIG. 3 showing a detailed sectional view of a preferred embodiment of a slidable clamping device according to present invention.

The construction of slidable clamping device 100 is best shown in the exploded view of FIG. 2B, the sectional view of FIG. 2C and the detailed cross-sectional view of FIG. 4. Slidable clamping device 100 comprises an insert 110 having a first end 112 and a second end 113, first cap 120, second cap 130, first biasing member 140 and second biasing member 150. First cap 120 has aperture 102*a* and a corresponding aperture 102*c* (shown in FIG. 4). Apertures 102*a* and 102*c* of first cap 120 are sized to receive first leg 22 of flexible member 20. Second cap 103 has aperture 103*a* and corresponding aperture 103*c* (shown in FIG. 4), which are sized to receive second leg 23 of flexible member 20. Insert 110 preferably has a first bore 102*b* and a second bore 103b, which are sized to receive first leg 22 and second leg 24, respectively, of flexible member 20. The interior of first cap 120 is dimensioned to slidably receive a first end 112 of insert 110, and the interior of second cap 130 is dimensioned to slidably receive second end 113 of insert 110. First biasing member 140 is dimensioned to be received within the interior of first cap 120, and second biasing member 150 is dimensioned to be received within the interior of second cap 130.

To assemble clamping device 100, first biasing member 140 is placed within the interior of first cap 120, and first cap 120 is then, in turn, placed over the first end 112 of insert 110, thereby compressing first biasing member 140 so that aperture 102a and corresponding aperture 102c of first cap 120 align with first bore 102b of insert 110. First leg 22 of flexible member 20, without first end stop 24 attached, is then passed through passage 102 formed by the alignment of aperture 102a, first bore 102b and corresponding aperture 102c. Ornament 30, if desired, is then mounted to flexible member 20. Second biasing member 150 is then placed within the interior of second cap 130, and second cap 130 is, in turn, placed over the second end 113 of insert 110, thereby compressing second biasing member 150 so that aperture 103a and corresponding aperture 103c of second cap 130 align with second bore 103b of insert 110. Second leg 23 of flexible member 20, without second end stop 25 attached, is then passed through passage 103 formed by the alignment of aperture 103a, second bore 103b and corresponding aperture 103c. First end stop 24 can then be attached to the first free end of first leg 22 and second end stop 25 can then be attached to the second free end of second leg 23, respectively, using a conventional attachment method, such as soldering. First and second end stops 24 and 25 are sized so that they are larger than the diameter of passages 102 and 103, and, therefor, first and second end stops 24 and 25 cannot pass through passages 102 and 103.

In its normal, resting condition, slidable clamping device 100 securely prevents relative movement between slidable clamping device 110, first leg 22 and second leg 23. Relative movement is prevented by shear forces applied to first and second legs 22 and 23 by first and second biasing members 140 and 150, respectively. First biasing member 140 tends to force first cap 120 away from the first end 112 of insert 110, and thereby creates a misalignment between aperture 102a and first bore 102b as well as misalignment between first bore 102b and corresponding aperture 102c. This misalignment produces a shear force on first leg 22 at aperture 102b and corresponding aperture 102c. Second biasing member 150 applies another shear force to second leg 23 by creating a misalignment between aperture 103a and second bore 103b as well as a misalignment between second bore 103b and corresponding aperture 103c. The shear forces applied to first and second legs 22 and 23 keep them firmly secured within passages 102 and 103 and prevent relative movement. While coil springs are preferable for first and second biasing members 140 and 150, a wide variety of other biasing members can be utilized, including compressible materials, such as rubber, as long as the biasing members exert sufficient force to prevent relative movement between sildable clamping device 100, first leg 22 and second leg 23.

Slidable clamping device 100 can easily be adapted to slide freely along the lengths of first and second legs 22 and 23 by depressing first and second caps 120 and 130, as shown best in FIGS. 2A–2C, to compress first and second biasing members 140 and 150. This external compressive force reduces the misalignment between aperture 102a, corresponding aperture 102c and first bore 102b and reduces the misalignment between aperture 103a, corresponding aperture 103c and second bore 103b, which, in turn, reduces the shear forces applied to first and second legs 22 and 23. With the shear forces reduced, slidable clamping device 100 can be freely slid along the lengths of first and second legs 22 and 23 to adjust the size of loop portion 21 of flexible member 20. Slidable clamping device 100 can then be adapted to once again prevent relative movement between slidable clamping device 100 and first and second legs 22 and 23 by simply removing the external compressive force applied to first cap 120 and second cap 130.

It will be understood by those skilled in the art that, while an insert 110 having two passages 102 and 103 is preferable, insert 110 can, alternatively, have a single passage, with first leg 22 and second leg 23 both extending through the single passage. In this alternative embodiment of the invention, it would only be necessary to utilize a single cap, such as first cap 120, and a single biasing member, such as first biasing member 140. It will also be recognized that slidable clamping device 100 can be partially enclosed within a decorative housing, and that the housing can comprise precious stones and other ornamental features.

Thus, while certain preferred embodiments of the invention have been shown and described, it will be appreciated from this description that many changes and modifications can be made thereto without departing from the spirit and scope of the invention.

What is claimed is:

1. An article of adjustable jewelry comprising:
   a slidable clamping device. the slidable clamping device including:
   (a) an insert having a first end and a second end with first and second bores adjacent the first and second ends, respectively;
   (b) a first end cap slidably positioned on the first end of said insert, said first end cap including an aperture for alignment with the first bore
   (c) a second end cap slidably positioned on the second end of said insert, said second end cap including an aperture for alignment with the second bore;
   (d) a first biasing member disposed between said first cap and the first end of said insert; and
   (e) a second biasing member disposed between said second cap and the second end of said insert;
   a flexible member with a first leg, a second leg, and a loop portion disposed between the first and second legs;
   the first leg of said flexible member extending through the first cap aperture and the first bore, and the second leg of said flexible member extending through the second cap aperture and the second bore, said apertures and said bores being misaligned under forces from said biasing members to thereby prevent relative movement between said slidable clamping device and said first and second legs of said flexible member, said slidable clamping device adapted to freely slide along the first leg and the second leg of said flexible member when the end caps are slid along said insert against said forces to thereby adjust the size of the loop portion of said flexible member; and
   an ornament slidably mounted to the loop portion of said flexible member.

2. An article of adjustable jewelry according to claim 1, further comprising:
   a first end stop attached to the first leg of said flexible member, said first end stop being larger than the first cap aperture of said slidable clamping device; and a second end stop attached to the second leg of said flexible member, said second end stop being larger than the second cap aperture of said slidable clamping device.

3. An article of adjustable jewelry according to claim 2, wherein said flexible member is a chain.

4. An article of adjustable jewelry according to claim 3, wherein said first biasing member is a coil spring.

5. An article of adjustable jewelry according to claim 3, wherein said second biasing member is a coil spring.

* * * * *